United States Patent
Northcutt

(10) Patent No.: US 7,310,534 B2
(45) Date of Patent: Dec. 18, 2007

(54) LOCATION STATUS INDICATOR FOR MOBILE PHONES

(75) Inventor: John W. Northcutt, Chapel Hill, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 367 days.

(21) Appl. No.: 10/707,463

(22) Filed: Dec. 16, 2003

(65) Prior Publication Data

US 2005/0130680 A1 Jun. 16, 2005

(51) Int. Cl.
H04Q 7/20 (2006.01)

(52) U.S. Cl. .............. 455/456.6; 455/456.1; 455/457; 701/207; 342/357.08

(58) Field of Classification Search ........... 455/456.6, 455/456.1, 457, 566, 435.1; 701/207, 209; 342/357.08, 357.01; 709/217; 340/988
See application file for complete search history.

(56) References Cited

U.S. PATENT DOCUMENTS

| | | | |
|---|---|---|---|
| 6,127,945 A * | 10/2000 | Mura-Smith | 340/988 |
| 6,360,101 B1 | 3/2002 | Irvin | |
| 6,934,911 B2 * | 8/2005 | Salmimaa et al. | 715/744 |
| 6,941,127 B2 * | 9/2005 | Muramatsu | 455/404.2 |
| 6,978,209 B2 * | 12/2005 | Nakahara et al. | 701/209 |
| 2002/0032035 A1 * | 3/2002 | Teshima | 455/456 |
| 2002/0115437 A1 * | 8/2002 | Fukui et al. | 455/435 |
| 2002/0115450 A1 * | 8/2002 | Muramatsu | 455/456 |
| 2002/0173906 A1 | 11/2002 | Muramatsu | |
| 2003/0013461 A1 * | 1/2003 | Mizune et al. | 455/456 |
| 2003/0069693 A1 | 4/2003 | Snapp et al. | |
| 2003/0100316 A1 | 5/2003 | Odamura | |
| 2003/0201912 A1 * | 10/2003 | Hashida et al. | 340/995.12 |
| 2004/0030756 A1 * | 2/2004 | Matsuyama et al. | 709/217 |
| 2004/0203768 A1 * | 10/2004 | Ylitalo et al. | 455/435.1 |

(Continued)

FOREIGN PATENT DOCUMENTS

EP 0979016 7/1999

(Continued)

OTHER PUBLICATIONS

Sony Ericsson Mobile Communications AB, *International Search Report*, PCT/US2004/024120, Feb. 7, 2005.

(Continued)

*Primary Examiner*—Danh Le
(74) *Attorney, Agent, or Firm*—Frederick D. Bailey; Moore & Van Allen, PLLC

(57) ABSTRACT

A method of presenting location data representing a mobile phone's current approximate location to a mobile phone user via the mobile phone display. The location information is iconically displayed and periodically updated. To display location information, the mobile phone determines its current position. Once the current position is determined, the mobile phone looks up locations within a predetermined distance from the current position of the mobile phone. The mobile phone then compares the results and selects the location/location icon pairing that is closest to the current position of the mobile phone. This location icon is then displayed on the mobile phone display. The mobile phone then waits a predetermined period before re-determining the current position of the mobile phone and repeating the search/display processes. Both the predetermined wait period and predetermined distance from the current position are user defined parameters that can be altered at the user's discretion.

30 Claims, 3 Drawing Sheets

U.S. PATENT DOCUMENTS

2004/0204831 A1* 10/2004 Pochuev et al. ............ 701/207
2006/0148488 A1* 7/2006 Syrbe ...................... 455/456.1

FOREIGN PATENT DOCUMENTS

| EP | 1 258 707 | 5/2002 |
|----|-----------|--------|
| WO | WO 01/74034 | 10/2001 |
| WO | WO 01/74037 | 10/2001 |
| WO | WO 2004/028176 | 4/2004 |

OTHER PUBLICATIONS

Sony Ericsson Mobile Communications AB, *Written Opinion*, PCT/US2004/024120, Feb. 7, 2005.
Sony Ericsson Mobile Communications AB, *Written Opinion*, PCT/US04/024120, Dec. 1, 2005, 2005.
Sony Ericsson Mobile Communications AB, "International Preliminary Report on Patentability," Mar. 17, 2006.

* cited by examiner

LOCATION STATUS INDICATOR FOR MOBILE PHONES

BACKGROUND OF INVENTION

Mobile phones today include sophisticated hardware and software designed to enhance the user experience. One of the more recent features to be incorporated into mobile phones is positioning technology. Mobile positioning technology such as the Global Positioning System (GPS), and non-GPS location techniques such as Cell Of Origin (COO) for location dependent services, Enhanced Observed Time Differential (E-OTD), and Time Of Arrival (TOA) allow a user to determine his current location. Mobile positioning information is very useful in a variety of applications, most notably for 9-1-1 services.

Mobile positioning technology can also be used to enhance a user's mobile phone experience by displaying current position information. This information can, in turn, be shared with others in, for instance, a wireless village group. A wireless village is a loose association of individuals that have agreed to band together and share or exchange status data pertaining to their mobile phones among the group. The wireless village is centralized on a carrier network so as to provide access to all group members that have registered.

SUMMARY OF INVENTION

The present invention describes a method of presenting location data representing a mobile phone's current approximate location to a mobile phone user via the mobile phone display. The location information is iconically displayed and periodically updated. In addition, the location data can be shared with other mobile phone or computer users if desired.

To display location information, it follows that the mobile phone must be able to determine its current position. This can be achieved in any number of ways including, but not limited to, Global Positioning System (GPS), Enhanced Observed Time Differential (E-OTD), Time Of Arrival (TOA), or Cell Of Origin (COO) systems within the mobile phone.

Once the current position is determined, the mobile phone looks up locations within a predetermined distance from the current position of the mobile phone. There is both an internal and an external database that the mobile phone searches. The external database resides on the mobile phone network and contains location icons and the underlying coordinates of the location icons. This database is accessible to the mobile phone via an over-the-air data connection. The internal database resides in the mobile phone and contains user-defined location icons and location icon coordinates.

After a location search has been performed, the mobile phone compares the results and selects the location/location icon pairing that is closest to the current position of the mobile phone. This location icon is then displayed on the mobile phone display.

The mobile phone then waits a predetermined period before re-determining the current position of the mobile phone and repeating the search/display processes. Both the predetermined wait period and predetermined distance from the current position are user defined parameters that can be altered at the user's discretion.

As an additional feature, the displayed icon can be manipulated to indicate proximity to the current position. The appearance of the location can appear darker when the current position of the mobile phone is closer to the underlying location of the location icon and lighter when the current position of the mobile phone is further from the underlying location of the location icon. If the mobile phone is equipped with a color display, then the appearance of the location icon can appear in a first color when the current position of the mobile phone is closer to the underlying location of the location icon and in a second color when the current position of the mobile phone is further from the underlying location of the location icon.

Textual data can accompany the icon to further inform the user of his current position with respect to the location icon. Primary data pertaining to the location icon including a distance and heading measurement can be displayed along with the location icon. Moreover, secondary data pertaining to the location icon that can be displayed on the mobile phone wherein the secondary data includes actual coordinate data, a map, or the like. The secondary data can be accessed by selecting the location icon. This will cause the primary display data to be replaced with the secondary display data. The user can easily switch back to the primary display data when done viewing the secondary data.

Another feature is the ability for the user to share his location status with other users that are part of a group such as in a wireless village scenario. This entails causing the mobile phone to upload the current position and location icon data to a network server such that it can be accessed by other mobile phone users. Even computer users can access the location data so long as the mobile phone network server has a connection with the Internet.

DETAILED DESCRIPTION

Figure 1:
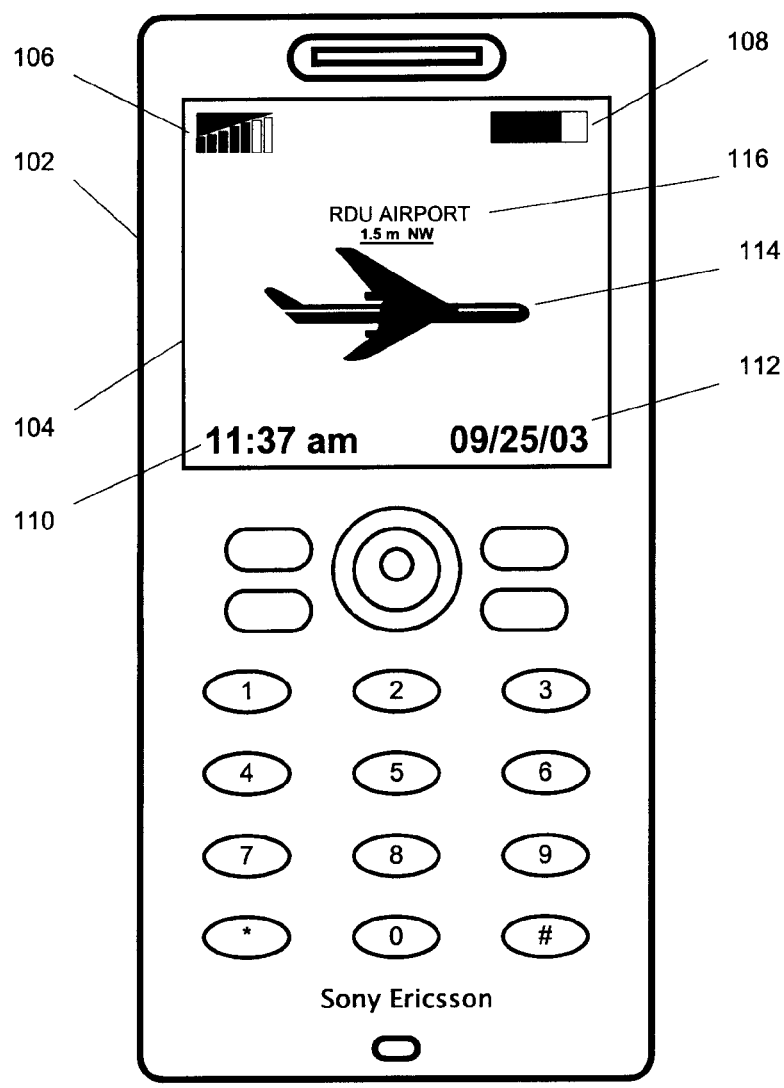
FIG. 1 is a front view of a typical mobile phone illustrating a location icon.
Figure 1:
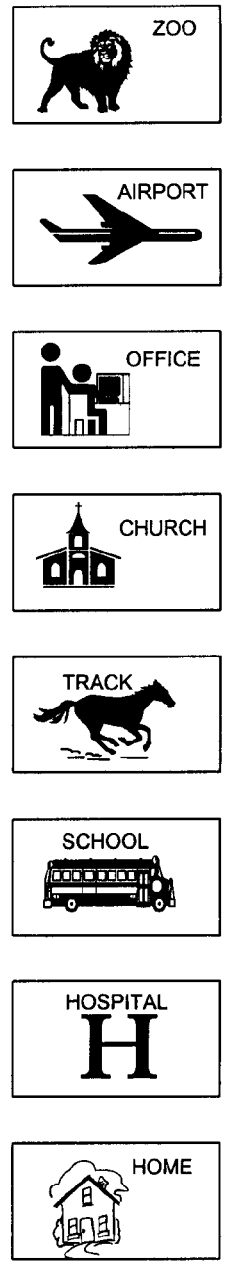

FIG. 1 is a front view of a typical mobile phone illustrating a location icon. A mobile phone 102 is shown in front view. A display area 104 provides a mobile phone user with status information pertaining to various features and functions of the mobile phone 102. In the upper left corner of display area 104, a dual signal strength indicator 106 for a voice signal and a data signal is pictured. The signal strength indicator 106 informs the user how well the mobile phone 102 is communicating with the nearest base station. In the upper right corner of display area 104, a battery strength indicator 108 informs the user of the remaining charge in the mobile phone's battery. In the lower left corner of display area 104, a digital clock 110 displays the current time. In the lower right corner of display area 104, the current date 112 is displayed.

The center part of display area 104 is reserved for a location icon 114 and a location icon description 116. In this example, the location icon 114 is an airplane indicating an airport. The location icon description 116 indicates the specific airport, RDU Airport, in this instance.

A variety of additional location icons have also been included for illustrative purposes. These icons and a corresponding location description are stored in the mobile phone or on the network. The icons shown in FIG. 1 do not comprise an all inclusive list. Additional icons can be added to the mobile phone or network. The icons shown are merely a representative illustration to assist in describing the present invention.

Figure 2:
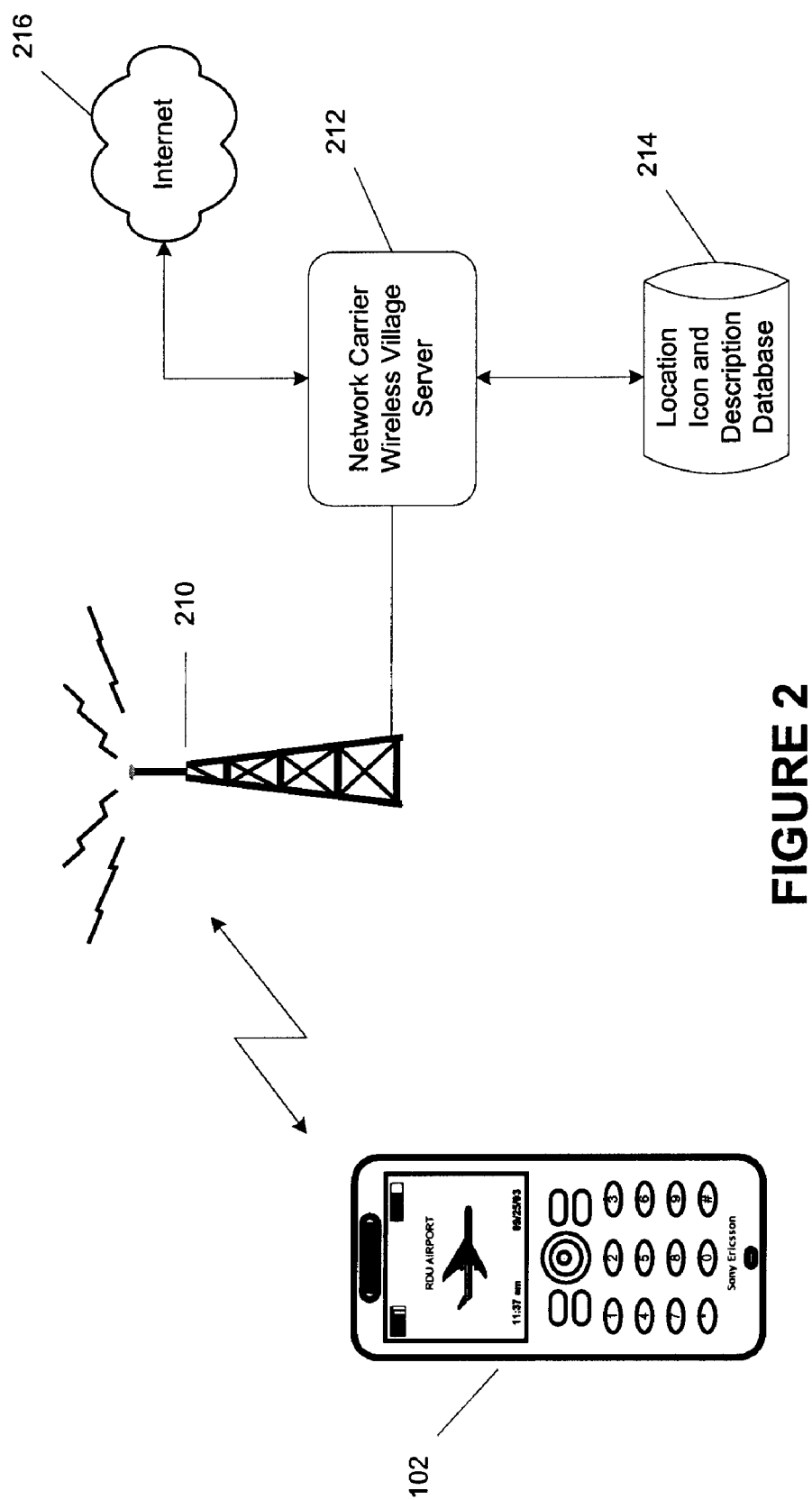
FIG. 2 is a block diagram illustrating the communication links between the mobile phone and the mobile phone carrier network.

FIG. 2 is a block diagram illustrating the communication links between the mobile phone and the mobile phone carrier network. One of the features of the present invention is the ability to share mobile phone location data with other members of a group in a 'wireless village' arrangement. A wireless village group is similar to a PC buddy list. Mobile phone 102 can establish both voice and data connections with a basestation 210. Basestation 210 is linked to the carrier's network that includes a wireless village server 212. The wireless village server 212 contains data that coordinates mobile phone users into groups and manages the activities of the groups. In addition, a database of location icons and location icon descriptions 214 is accessible to the wireless village server 212. The database 214 is comprised of location icons and corresponding descriptions that are linked with a geographic coordinate system. Each icon has its own unique geographic location.

Moreover, the wireless village server 212 can also be linked with the Internet 216 so as to provide group access via the Internet as well as a mobile phone. A login procedure would provide secure access so that only group members would have access to other group members location data. Group members can also opt in or out of the location icon feature at their discretion. The opt in or out feature is a function in each mobile phone that is selectable by the mobile phone user.

Figure 3:
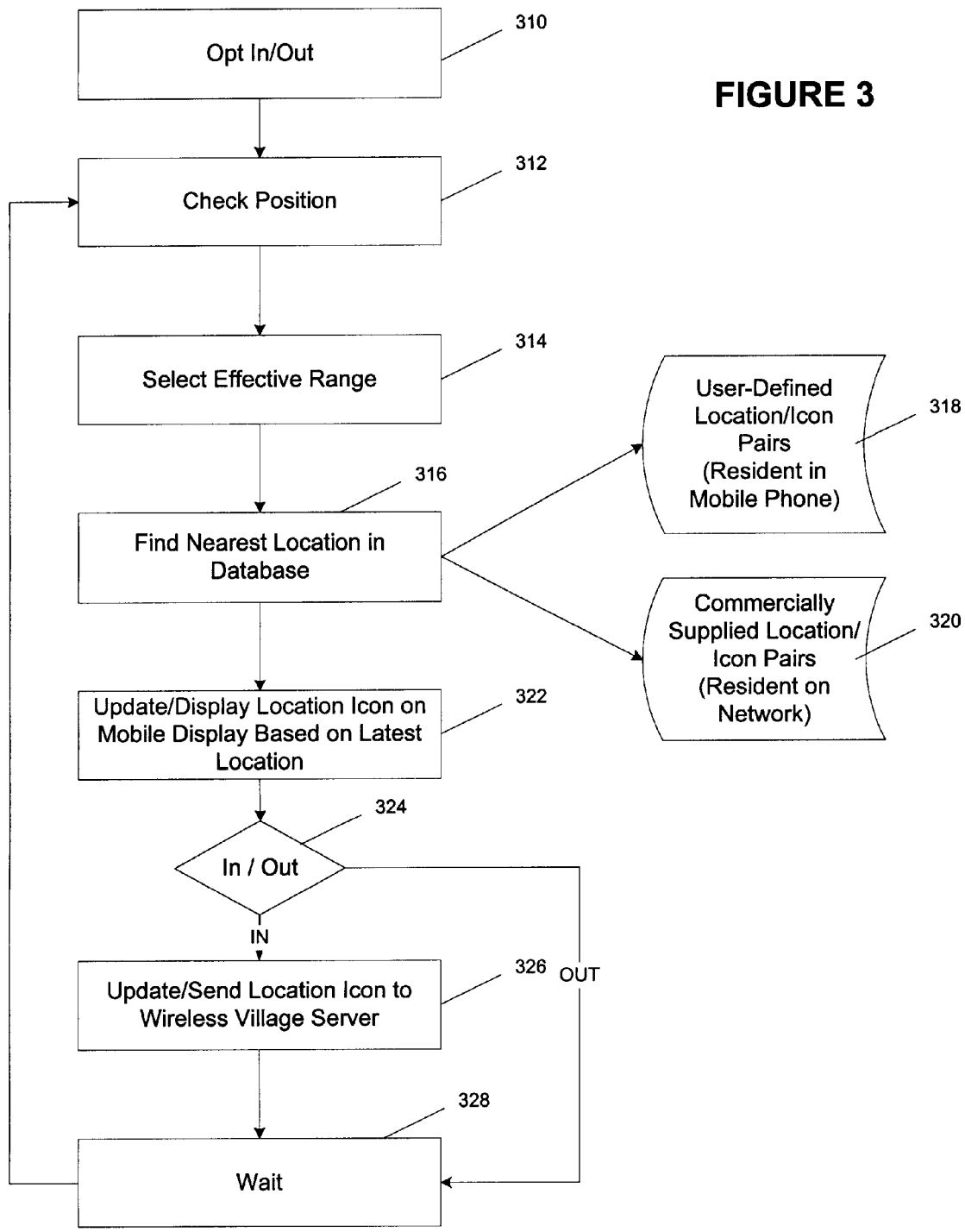
FIG. 3 is a flowchart describing how a location icon is displayed on a mobile phone.

FIG. 3 is a flowchart describing how a location icon is displayed on a mobile phone. Whenever the mobile phone is powered on, the user would be prompted by the mobile phone as to whether they want their location data accessible to other members of a group linked via a wireless village server within the network infrastructure. This is an opt in/out feature 310. Thereafter, the user may opt in or out at their discretion. This feature can be set to only affect the ability of others to view the user's location icon data. The user can always view his own location if he so desires without sharing the data with other members of the group.

After selecting whether to opt in or out, the mobile phone performs a position check 312. This entails the mobile phone accessing and using its internal position determination system to obtain a set of coordinates that represent the mobile phone's current location. According to the present invention, a mobile phone would be equipped with one or more position determining systems such as Global Positioning System (GPS), and non-GPS location techniques such as Cell Of Origin (COO) for location dependent services, Enhanced Observed Time Differential (E-OTD), and Time Of Arrival (TOA).

The location coordinate data is temporarily stored. The location data is subjected to a rough calibration process that requires the user to select an effective range 314. The effective range is a distance measurement from the current location. This distance represents a range from the phone that constrains the location data. In other words, no icons representing locations farther than the selected effective range will be displayed. The effective range setting will have a user selectable default such as 500 feet. The user may also change the effective range to ½ mile, 1 mile, or any other distance so desired. Control over the effective range allows the user to adapt to his current surroundings. For instance, if the user were in a rural area he could set the effective range to 10 miles without being inundated with possible locations within that range. Conversely, if the user were in an urban area, he could set the effective range to a few hundred feet so as to avoid being inundated with locations within the range.

Once the effective range is selected 314, the mobile phone searches for the nearest location within the effective range. The mobile phone consults an internal 318 and an external 320 database to find such locations. The internal database 318 represents more personalized locations such as the user's hoe, office, a friend's house, a relative's house, and the like. The external database 320 resides on the network and includes commercial locations such as airports, landmarks, street corners, churches, schools, hospitals, etc.

The search will return as many locations within the effective range as it finds. Each is compared to determine which is the closest to the mobile phone's current location and a list of location/icon(s) is generated from nearest to furthest. By default, the closest location and its corresponding icon will be displayed and/or updated on the mobile phone's display 322. If the user desires a different location/icon that is within the effective range, however, he may select such a location/icon. The user may then instruct the mobile phone to keep this location/icon displayed until it is no longer within the current effective range.

If no locations are found within the effective range, the mobile phone can inform the user and prompt for a new effective range. The location icon also includes a brief descriptor of the location such as "RDU airport" or "New Albany Elementary School". In addition, the brief descriptor can include distance and heading data such as "1.5 m NW" indicating that the location icon is 1½ miles northwest of the mobile phone's current location.

A visual cue as to the current distance the phone is from the location represented by the icon can also be implemented. For instance, the icon can be shaded such that it will appear darker when the actual location is close to the icon location coordinates. Conversely, the icon can be faded somewhat to indicate that the actual location is more distant from the icon location coordinates. The shading would be proportional to the effective range selected by the user. If the effective range were 1 mile, the icon could be shaded darker for current locations within ¼ mile of the icon location coordinates. On the other end of the spectrum, the icon could be shaded lightly for current locations between ¾-1 mile of the icon location coordinates. If the mobile phone has color display capabilities, the icon can change colors based on proximity to the icon location coordinates. A red icon could indicate close proximity while a blue icon could indicate that the mobile phone is nearer the outer limits of the effective range.

The next step is to check the opt in/out selection 324. If the user has opted "in", then the wireless village server is updated 326 with the user's location icon and data so that other group members can determine where the user is currently located. If the user has opted "out", the wireless village server is not provided with the user's location data.

The last step in the process is to wait 328 a certain period of time before checking the current position 312 again. This period can have a user set default and is user selectable as well. The user may wish to update his location more frequently when he is traveling so as to give an idea of how close he is to his intended destination. Once the wait period has expired control is returned to the 'check position' process 312.

Whenever an icon is displayed on the mobile phone, the user can select or highlight the icon to receive additional information about the underlying location. For instance, if the icon is a school, the user can select the icon and a new screen appears with information such as exact coordinates, driving directions, or a map to the location can be displayed. This information would be associated with the icon in its database.

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

The invention claimed is:

1. A method of presenting location data representing a mobile phone's current approximate location comprising:
   determining the current position of the mobile phone;
   looking up locations within a predetermined distance from the current position of the mobile phone;
   displaying a location icon representing a location within the predetermined distance to the current position of the mobile phone; and
   determining the distance between the current position of the mobile phone and an underlying location of the location icon.

2. The method of claim 1 further comprising waiting a predetermined period before re-determining the current position of the mobile phone.

3. The method of claim 2 further comprising prompting the user to input the predetermined period.

4. The method of claim 3 further comprising prompting the user to input the predetermined distance from the current position of the mobile phone.

5. The method of claim 1 further comprising changing the appearance of the location icon based on the distance between the current position of the mobile phone and the underlying location of the location icon such that the location icon appears darker when the current position of the mobile phone is closer to the underlying location of the location icon and lighter when the current position of the mobile phone is further from the underlying location of the location icon.

6. The method of claim 1 further comprising changing the appearance of the location icon based on the distance between the current position of the mobile phone and the underlying location of the location icon such that the location icon appears in a first color when the current position of the mobile phone is closer to the underlying location of the location icon and in a second color when the current position of the mobile phone is further from the underlying location of the location icon.

7. The method of claim 1 further comprising displaying primary data pertaining to the location icon including a distance and heading measurement, wherein the primary data is displayed along with the location icon.

8. The method of claim 7 further comprising accessing and displaying secondary data pertaining to the location icon that can be displayed on the mobile phone wherein the secondary data pertaining to the location icon includes coordinate data and is accessed by selecting the location icon.

9. The method of claim 1 wherein determining the current position of the mobile phone utilizes a Global Positioning System (GPS) system within the mobile phone.

10. The method of claim 1 wherein determining the current position of the mobile phone utilizes an Enhanced Observed Time Differential (E-OTD) system within the mobile phone.

11. The method of claim 1 wherein determining the current position of the mobile phone utilizes a Time Of Arrival (TOA) system within the mobile phone.

12. The method of claim 1 wherein determining the current position of the mobile phone utilizes a Cell Of Origin (COO) system within the mobile phone.

13. The method of claim 1 further comprising providing the location icon to a network server such that it can be accessed by other mobile phone users.

14. The method of claim 1 wherein location icons and the underlying coordinates of the location icons are stored in an external location icon database residing on the network wherein the external location icon database is accessible to the mobile phone and contains commercially supplied location icons and location icon coordinates.

15. The method of claim 1 wherein location icons and the underlying coordinates of the location icons are stored in an internal location icon database residing in the mobile phone wherein the internal location icon database contains user-defined location icons and location icon coordinates.

16. A mobile phone having a software application for presenting location data representing the mobile phone's current approximate location, said mobile phone comprising:
   a processor;
   a processor readable storage medium;
   code recorded in the processor readable storage medium to determine the current position of the mobile phone;
   code recorded in the processor readable storage medium to look up locations within a predetermined distance from the current position of the mobile phone;
   code recorded in the processor readable storage medium to display a location icon representing a location within the predetermined distance to the current position of the mobile phone; and code recorded in the processor readable storage medium to determine the distance between the current position of the mobile phone and the underlying location of the location icon.

17. The mobile phone of claim 16 further comprising:
code recorded in the processor readable storage medium to wait a predetermined period before re-determining the current position of the mobile phone.

18. The mobile phone of claim 17 further comprising:
code recorded in the processor readable storage medium to prompt the user to input the predetermined period.

19. The mobile phone of claim 17 further comprising:
code recorded in the processor readable storage medium to prompt the user to input the predetermined distance from the current position of the mobile phone.

20. The mobile phone of claim 16 further comprising:
code recorded in the processor readable storage medium to change the appearance of the location icon based on the distance between the current position of the mobile phone and the underlying location of the location icon such that the location icon appears darker when the current position of the mobile phone is closer to the underlying location of the location icon and lighter when the current position of the mobile phone is further from the underlying location of the location icon.

21. The mobile phone of claim 16 further comprising:
code recorded in the processor readable storage medium to change the appearance of the location icon based on the distance between the current position of the mobile phone and the underlying location of the location icon such that the location icon appears in a first color when the current position of the mobile phone is closer to the underlying location of the location icon and in a second color when the current position of the mobile phone is further from the underlying location of the location icon.

22. The mobile phone of claim 16 further comprising:
code recorded in the processor readable storage medium to display primary data pertaining to the location icon including a distance and heading measurement, wherein the primary data is displayed along with the location icon.

23. The mobile phone of claim 22 further comprising:
code recorded in the processor readable storage medium to access and display secondary data pertaining to the location icon that can be displayed on the mobile phone wherein the secondary data pertaining to the location icon includes coordinate data and is accessed by selecting the location icon.

24. The mobile phone of claim 16 wherein determining the current position of the mobile phone utilizes a Global Positioning System (GPS) system within the mobile phone.

25. The mobile phone of claim 16 wherein determining the current position of the mobile phone utilizes an Enhanced Observed Time Differential (E-OTD) system within the mobile phone.

26. The mobile phone of claim 16 wherein determining the current position of the mobile phone utilizes a Time Of Arrival (TOA) system within the mobile phone.

27. The mobile phone of claim 16 wherein determining the current position of the mobile phone utilizes a Cell Of Origin (COO) system within the mobile phone.

28. The mobile phone of claim 16 further comprising:
code recorded in the processor readable storage medium to provide the location icon to a network server such that it can be accessed by other mobile phone users.

29. The mobile phone of claim 16 wherein location icons and the underlying coordinates of the location icons are stored in an external location icon database residing on the network wherein the external location icon database is accessible to the mobile phone and contains commercially supplied location icons and location icon coordinates.

30. The mobile phone of claim 16 wherein location icons and the underlying coordinates of the location icons are stored in an internal location icon database residing in the mobile phone wherein the internal location icon database contains user-defined location icons and location icon coordinates.

* * * * *